US009764895B2

(12) United States Patent
Castro Salinas et al.

(10) Patent No.: US 9,764,895 B2
(45) Date of Patent: Sep. 19, 2017

(54) LATCH FOR COMPACTOR TRUCK HOPPER

(71) Applicant: Moisés Castro Salinas, Coacalco de Berriozabal (MX)

(72) Inventors: Moisés Castro Salinas, Coacalco de Berriozabal (MX); Fabián Moisés Castro Vargas, Coacalco de Berriozabal (MX); Cuahutémoc Castro Salinas, Coacalco de Berriozabal (MX)

(73) Assignee: Moisés Castro Salinas, Estado de Mexico (MX)

(*) Notice: Subject to any disclaimer, the term of this patent is extended or adjusted under 35 U.S.C. 154(b) by 0 days.

(21) Appl. No.: 15/310,962

(22) PCT Filed: May 14, 2015

(86) PCT No.: PCT/MX2015/000075
§ 371 (c)(1),
(2) Date: Feb. 17, 2017

(87) PCT Pub. No.: WO2015/174815
PCT Pub. Date: Nov. 19, 2015

(65) Prior Publication Data

US 2017/0166398 A1 Jun. 15, 2017

(30) Foreign Application Priority Data

May 14, 2014 (MX) .................. MX/u/2014/000204

(51) Int. Cl.
*B60P 1/26* (2006.01)
*B65F 3/00* (2006.01)
*B65F 3/02* (2006.01)

(52) U.S. Cl.
CPC ........ *B65F 3/00* (2013.01); *B65F 2003/0243* (2013.01); *B65F 2210/148* (2013.01)

(58) Field of Classification Search
CPC .................. B65F 3/00; B65F 2210/148; B65F 2003/0243
(Continued)

(56) References Cited

U.S. PATENT DOCUMENTS

| | | | |
|---|---|---|---|
| 2,752,194 | A | 6/1956 | Galloway |
| 3,965,919 | A | 6/1976 | McGarvey et al. |

(Continued)

FOREIGN PATENT DOCUMENTS

| | | | |
|---|---|---|---|
| EP | 0774547 | A1 | 5/1997 |
| GB | 2024148 | A | 1/1980 |

(Continued)

*Primary Examiner* — Stephen Gordon
(74) *Attorney, Agent, or Firm* — The Webb Law Firm

(57) ABSTRACT

The present invention relates to an opening and closing latch for a compactor truck hopper that can be used with refuse compactor trucks. The latch for a compactor truck hopper comprises: two identical upper supports attached to the upper left and upper right parts of the container of the truck; to hook-shaped lower plates located in the lower left and lower right parts of the container of the truck, each plate being accompanied by a stud, a spring and securing elements. The hopper latch of the present invention facilitates refuse unloading, since when the hopper comes into contact with the lower part of the latch, the lower part of the latch automatically closes and when the hopper ceases to be in contact with the lower part pf the latch, the lower part of the latch automatically remains free to be opened. Furthermore, the hopper latch, according to the present invention, provides complete and correct closure of the hopper to prevent undesired spillage of leachates during refuse compaction.

5 Claims, 3 Drawing Sheets

(58) Field of Classification Search
USPC ........ 298/23 S, 23 A, 23 F, 23 D, 23 DF, 38, 298/25; 296/56; 292/341.5, 341.18, 273, 292/274, 271
See application file for complete search history.

(56) References Cited

U.S. PATENT DOCUMENTS

| | | | | | |
|---|---|---|---|---|---|
| 4,155,586 | A | | 5/1979 | Flynn | |
| 4,545,523 | A | | 10/1985 | Galbreath et al. | |
| 5,158,340 | A | * | 10/1992 | Boda | B65F 3/00 298/23 M |
| 5,498,067 | A | * | 3/1996 | Christenson | B65F 3/00 298/23 MD |
| 5,813,310 | A | | 9/1998 | Hori et al. | |
| 5,860,233 | A | | 1/1999 | Roubinet | |
| 2003/0021665 | A1 | | 1/2003 | Maglaras et al. | |

FOREIGN PATENT DOCUMENTS

| | | | |
|---|---|---|---|
| GB | 1580459 | | 12/1980 |
| GB | 2108242 | A | 5/1983 |

* cited by examiner

LATCH FOR COMPACTOR TRUCK HOPPER

CROSS-REFERENCE TO RELATED APPLICATIONS

This application is the United States national phase of International Application No. PCT/MX2015/000075 filed May 14, 2015, and claims priority to Mexican Patent Application No. MX/u/2014/000204 filed May 14, 2014, the disclosures of which are hereby incorporated in their entirety by reference.

FIELD OF THE INVENTION

The present invention lies in the field of tools or useful elements for the assurance of hoppers. Particularly, the present invention relates to an opening and closing latch for a compactor truck hopper, which is useful for refuse compactor trucks.

BACKGROUND OF THE INVENTION

Domestic and international manufacturers handle the hopper's butterfly type latch, i.e., that in order to perform the hopper's opening and closing, the operator must move to the rear on both sides to turn the latch, this causes a great waste of time due to the operator's movement to manually control the hopper's opening and closing, also there is a risk that the latch does not remain well positioned, preventing the correct closure of the hopper and there is a possibility of spill leachates in the refuse compactor truck, with the corresponding risks of contamination.

On the other hand, both domestic and international compactor manufacturers, typically include hydraulic cylinders for lifting and lowering the hopper. However, these systems lack of adequate securing means once the hopper has lowered and simultaneously function as a guide when the hopper is lifted.

SUMMARY OF THE INVENTION

Therefore, an objective of the present invention is to provide a latch for compactor truck that correctly and completely closes the hopper during refuse compaction thereby preventing undesired spillage of leachates.

Another objective of the present invention is to provide a latch for the compactor truck hopper to facilitate the refuse unloading, since when the hopper contacts with the lower part of the latch, it is automatically closed and when the hopper stops being in contact with the lower part of the latch, it is automatically free for opening.

BRIEF DESCRIPTION OF INVENTION FIGURES

DETAILED DESCRIPTION OF THE INVENTION

Figure 1A:
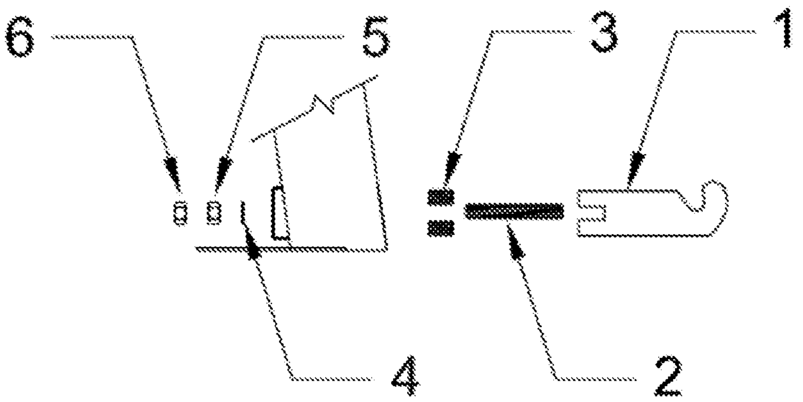
FIGS. 1A and 1B are exploded views of the lower part (1A) and upper (1B) parts for the hopper's latch according to the present invention.
Figure 1B:
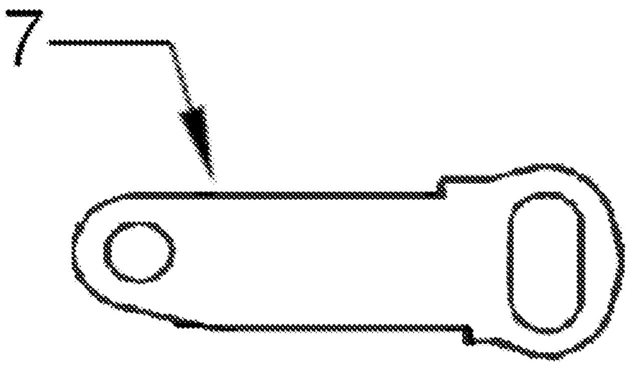

This invention is described in relation to the accompanying figures. As best appreciated in FIGS. 1A and 1B, the hopper's latch of the present invention is comprised of two hook-shaped plates (1), one arranged on the lower left side and other on the lower right side of the truck, preventing the hopper's opening during refuse compaction; two manifold studs (2), one on the lower left side and other on the lower right side of the truck, arranged to perform the function of two long screws that extend the stroke of the hook-shaped plates (1) and act as fastening elements for the lower part of the hopper's latch. Each manifold stud (2) is fixed to the container of the truck by passing one end in a hole previously bored in the lower part of the container of the truck, the other end is welded to a hook-shaped plate (1); two pairs of springs (3), one for each side of the truck, placed in the upper and in the lower parts of the manifold stud, arranged to perform the function of buffering during the adjustment of the lower part of the hopper's latch; fastening elements such as two washers (4), two nuts (5) and two locking nuts (6), a set of the same for the lower left and a set for the lower right sides of the truck, arranged to fasten the lower part of the hopper's latch to the lower part of the container of the truck and also to adjust the position of the hook-shaped plates (1); two upper supports (7), one for the upper left side and one for the upper right side of the truck, joined by welding to the upper part of the container of the truck, having these upper brackets (7) the function of providing a variable rotation point for the hopper and at the same time a guide for the lifting and lowering of the hopper during opening and closing movements, in order to make the hopper automatically coupled with the hook-shaped plates (1).

Figure 2:
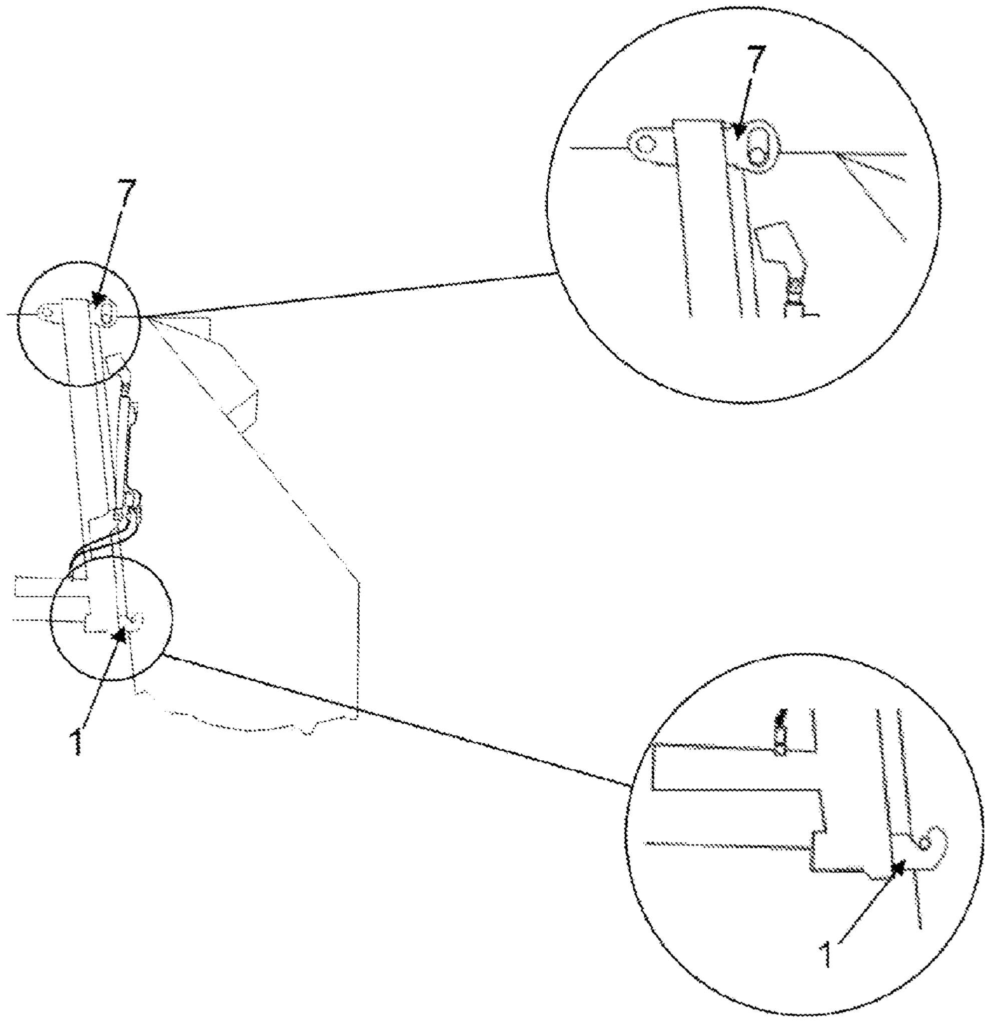
FIG. 2 is a side view of the hopper of a refuse compactor truck, where the hopper's latch functioning is appreciated, with the hopper in a closed position.
Figure 3:
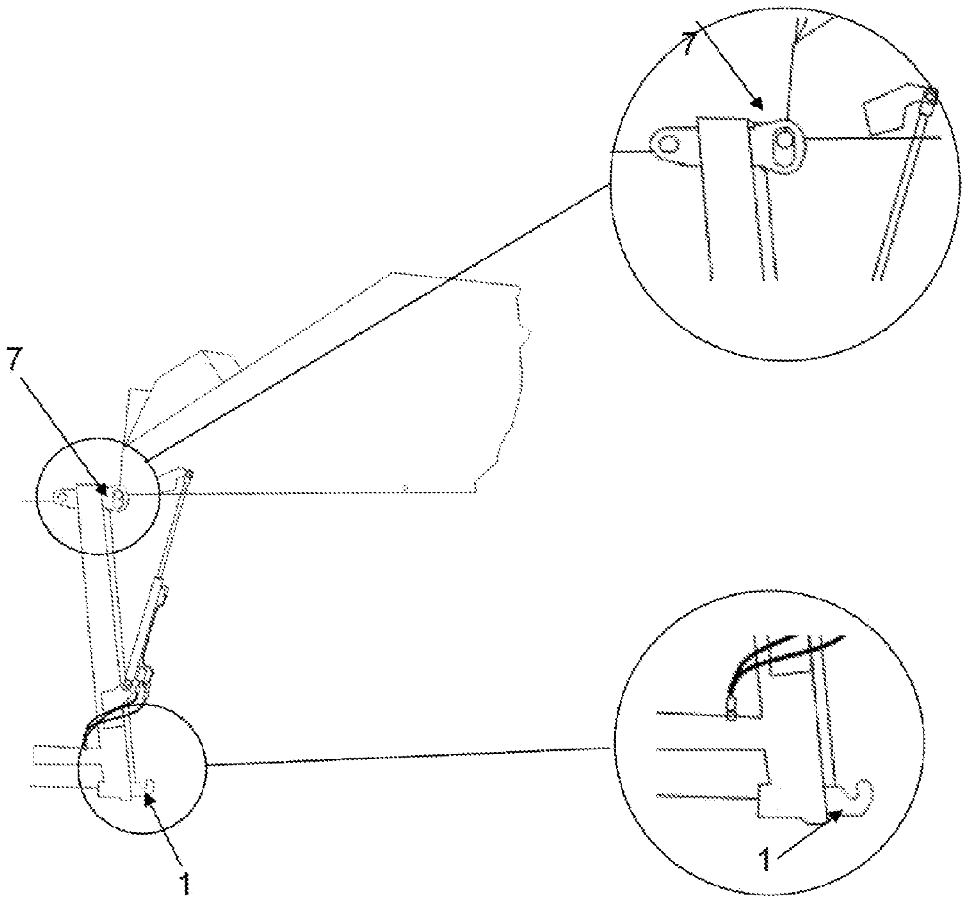
FIG. 3 is a side view of a refuse compactor truck hopper, where the hopper's latch functioning is appreciated, with the hopper in an open position.

The latch for compactor truck hopper consists of two identical upper brackets (7) that have an elliptical cavity, set on the upper left and right parts of the truck, as can be appreciated in FIG. 2, where the upper left bracket position is shown (7). Said latch is also comprised of two lower hook-shaped plates (1) located in the lower left and right sides of the container of the truck, each one is accompanied by a manifold stud, a spring (3) and the aforementioned fastening elements, as can be appreciated in FIG. 3, where the position of the lower plate is shown in the form of a left hook (1).

In addition, the hopper's latch of the present invention, completely closes the hopper during refuse compaction, which prevents spillage of leachates.

The two upper supports (7) function as variable rotation points between the hopper and the refuse compactor of the container of the truck, while allowing to guide the lifting and lowering hopper's movements in order to automatically coupled with the lower hook-shaped plates (1) when the lower part of the hopper comes in contact with them. This movement is carried out in two stages, the first consisting of vertical elevation of the hopper assembly caused by a hydraulic cylinder, followed by the second stage which is the elevation with respect to the upper axis formed by the elliptical cavity of the upper support (7), which prevents the truck operator from manually opening and closing the left and right hopper latches. Thus, the refuse compactor unit's operation is facilitated and operating times are reduced during the refuse unloading.

In addition, the compactor truck hopper latch is strategically located in the compactor of the container of the truck, so it is not required that any item be disassembled for installation or maintenance. This location can be appreciated in FIGS. 2 and 3.

The present invention have been described according to a preferred modality; however, it will be apparent for a skill person in the art that modifications may be made to the invention without turning away from its spirit and scope.

The invention claimed is:

1. A hopper latch for a refuse compactor truck provided with hydraulic cylinders for opening and closing the hopper, the hopper latch comprising: two hook-shaped plates, one for the left side and the other for the right side of the truck, configured to hold the hopper and avoid the lifting of the hopper during refuse compaction; two manifold studs, one for the left and one for the right side of the truck, configured to connect elements of a lower part of the hopper latch and expand a stroke adjustment of the hook-shaped plates, each manifold stud fixed to a container of the truck by passing one end of the respective stud into a hole at a lower part of the truck and another end of the stud is welded to a respective one of the hook-shaped plates; two springs placed on sides of the manifold stud, one for an upper and one for a lower side with respect to the manifold stud, located between the respective hook-shaped plate and the container of the truck, to cushion a load between the hook-shaped plates and the container of the truck and facilitate the hook-shaped plates' adjustment; fastening elements, including a set of the fastening elements for the left side and a set for the right side of the truck, arranged to maintain the manifold studs fixed and therefore the hook-shaped plates to the refuse compactor of the container of the truck and to serve as adjustment elements of the hook-shaped plates; and two upper supports with an elliptical cavity, configured to work as a variable rotation point and to guide the hopper's lifting and lowering movements, such that the hopper is automatically coupled with the hook-shaped plates.

2. The hopper latch according to claim 1, wherein component elements of the latch are arranged such that the hopper makes a full and proper closure during the refuse compaction, thereby preventing undesired spillage of leachates.

3. The hopper latch according to claim 1, wherein when the hopper comes into contact with the lower part of the latch, the lower part of the latch automatically closes, and when the hopper ceases to be in contact with the lower part of the latch, the lower part of the latch automatically remains free to be opened to facilitate refuse unloading.

4. The hopper latch according to claim 1, wherein the two upper supports comprise a rotary seal between the hopper and refuse compactor of the container of the truck and functions to guide the movements of lifting and lowering the hopper, such that the hopper is automatically coupled with the lower hook-shaped plates.

5. The hopper latch according to claim 1, wherein the fastening elements comprise two washers, two nuts, and two locknuts.

* * * * *